Feb. 6, 1934.  G. T. HIETT  1,946,163
FILTER
Filed April 15, 1931
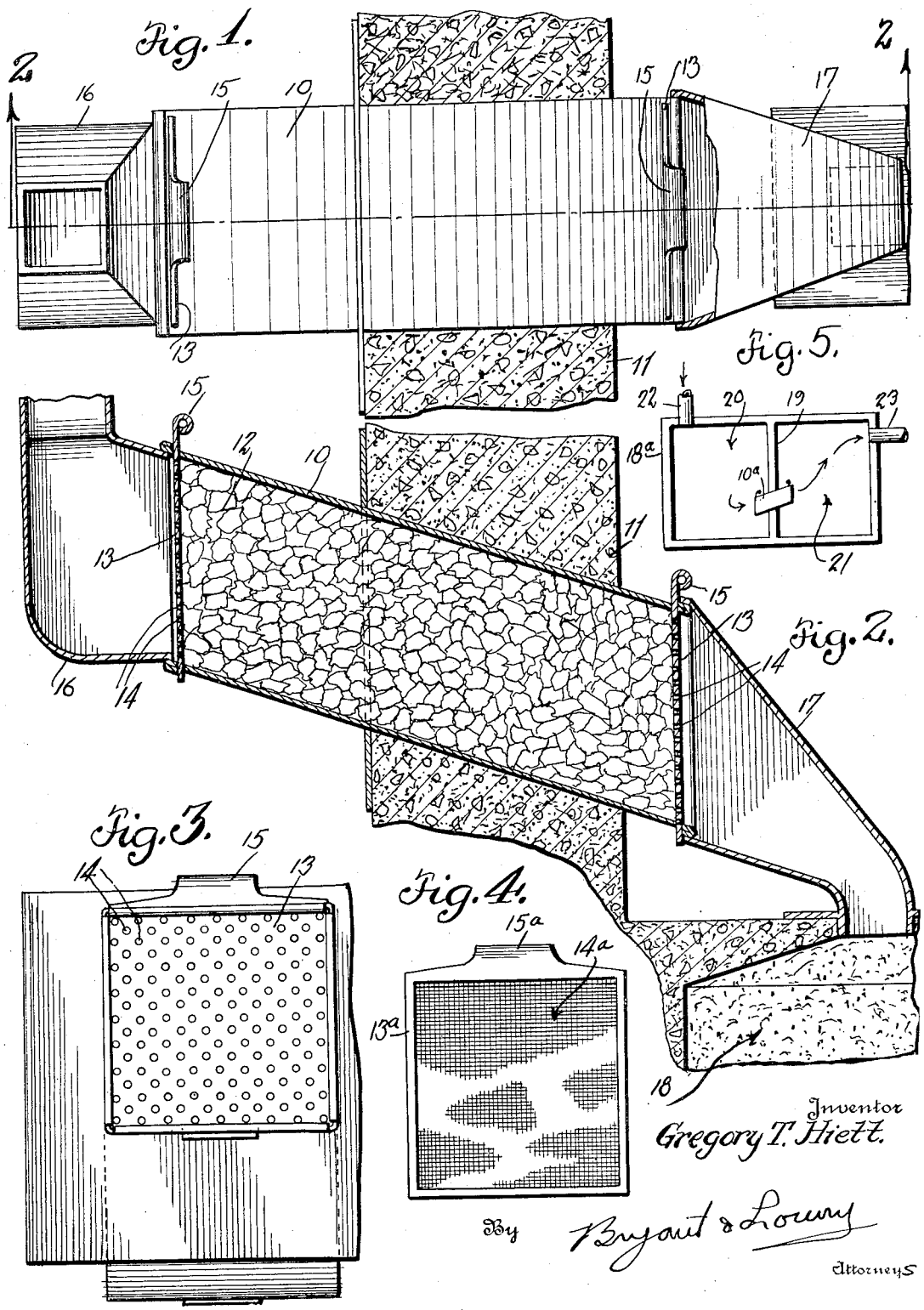
Inventor
Gregory T. Hiett.
By Bryant & Lowry
Attorneys Patented Feb. 6, 1934

1,946,163

UNITED STATES PATENT OFFICE 1,946,163

FILTER

Gregory T. Hiett, Delphos, Ohio

Application April 15, 1931. Serial No. 530,343

1 Claim. (Cl. 210—88)

This invention relates to certain new and useful improvements in filters.

The primary object of the invention is to provide a filter especially for use in connection with cistern water with the filter device interposed in the path of flow of water, being preferably set into a wall structure with a down spout in communication with one end thereof while the other end discharges into a cistern, reticulated or screen gates carried by the ends of the filter, retaining the filtering material in position and permitting substantially free flow of water from the down spout to the cistern.

A further object of the invention is to provide a filter structure of the foregoing character wherein the filter device may be set into a partition wall in a cistern or tank and arranged at an inclination with its lower end disposed within the cistern compartment containing and receiving unfiltered water with its raised end in the other compartment into which flows the filtered water.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a top plan view of a filter constructed in accordance with the present invention, the same being illustrated as set into and extending through a wall structure;

Figure 2 is a vertical longitudinal sectional view taken on line 2—2 of Figure 1, showing the fitting at each end of the filter, one fitting to be placed into communication with the down spout and the other fitting communicating with a cistern;

Figure 3 is an end elevational view of the filter with the inlet fitting removed and showing a reticulated closure gate for the end of the filter;

Figure 4 is an elevational view showing a screen closure gate for a filter end; and Figure 5 is a detail sectional view of a cistern having the vertical partition wall therein with the filter set into the wall.

Referring more in detail to the accompanying drawing and particularly to Figures 1 to 4, the reference character 10 designates a filter casing of elongated tubular form and of any desired configuration in cross-section, the same being herein illustrated as rectangular and mounted in a building wall 11 to extend from opposite sides thereof. Filter material 12, such as sand, gravel, charcoal or any other preferred material is confined within the filter casing 10 by end gates 13, illustrated in Figures 2 and 3 as being of a reticulated character as at 14, the end gates 13 being slidably mounted in position transversely of the ends of the filter casing, a handle grip 15 carried by each end gate facilitating operation thereof.

The inlet end of the filter casing 10 has a fitting 16 detachably connected thereto that is adapted to be placed in communication with a down spout, while the outlet end of the filter casing 10 has a fitting 17 removably associated therewith and being in communication with a cistern 18. The water from the down spout enters the fitting 16 and flows to the filter casing 10 to be directed by the fitting 17 into the cistern 18. The filter casing 10 is arranged as an inclination and when desired, the filtering material 12 may be removed and the casing cleaned by removing the gate 13 associated with the lower end of the casing.

In lieu of the reticulated gates shown in Figures 2 and 3, the screen gate shown in Figure 4 may be employed, this gate comprising a frame 13a carrying a screen mesh 14a and provided with a handle grip 15a.

The cistern 18a shown in Figure 5 is provided with a vertical partition 19 defining side compartments 20 and 21, the down spout or water supply 22 being in direct communication with the compartment 20. The filter casing 10a is set into the partition wall 19 at an inclination with its lower end located within the compartment 20 containing the unfiltered water while its raised end extends into the compartment 21 which receives filtered water flowing through the filter from the compartment 20, a suitable outlet 23 being provided for the filtered water compartment 21 of the cistern. The lower end of the filter casing 10a in the unfiltered water compartment 20 is disposed adjacent the bottom of the cistern and constitutes the clean out end of the filter casing. As stated, water in an unfiltered condition enters the compartment 20 of the cistern and flows through the filter casing 10a into the compartment 21 in a filtered condition.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

In a filter of the character described, the combination with a building wall having an inclined opening therein and a cistern at the inner side of the wall below the opening, of a filter consisting of a tubular member closed on all sides, open at its ends and placed in the inclined opening in the wall with the lower end of the tubular member disposed above the cistern, an inlet fitting on the outer upper end of the filter in communication with a downspout, an outlet fitting at the lower end of the filter having a sealed connection with the upper end of the cistern and a screen slide gate at each end of the filter inwardly of the inlet and outlet fittings.

GREGORY T. HIETT.